United States Patent
Roy

(10) Patent No.: US 7,317,701 B2
(45) Date of Patent: Jan. 8, 2008

(54) H.323 USER, SERVICE AND SERVICE PROVIDER MOBILITY FRAMEWORK FOR THE MULTIMEDIA INTELLIGENT NETWORKING

(75) Inventor: Radhika R. Roy, Howell, NJ (US)

(73) Assignee: AT&T Corporation, Bedminster, NJ (US)

( * ) Notice: Subject to any disclaimer, the term of this patent is extended or adjusted under 35 U.S.C. 154(b) by 0 days.

(21) Appl. No.: 10/835,632

(22) Filed: Apr. 30, 2004

(65) Prior Publication Data

US 2004/0223488 A1 Nov. 11, 2004

Related U.S. Application Data

(63) Continuation of application No. 09/642,980, filed on Aug. 18, 2000.

(60) Provisional application No. 60/156,363, filed on Sep. 28, 1999, provisional application No. 60/156,482, filed on Sep. 28, 1999.

(51) Int. Cl.
*H04Q 7/00* (2006.01)
*H04L 12/56* (2006.01)

(52) U.S. Cl. ............ 370/328; 370/400; 455/432.1

(58) Field of Classification Search ............ 370/313, 370/328, 331, 395.3, 395.31, 315, 338, 400–408, 370/395.54; 455/432.1–444
See application file for complete search history.

(56) References Cited

U.S. PATENT DOCUMENTS

| | | | |
|---|---|---|---|
| 5,764,750 A | 6/1998 | Chau et al. | |
| 5,862,471 A * | 1/1999 | Tiedemann et al. | 455/406 |
| 6,100,918 A | 8/2000 | Lu | |

(Continued)

FOREIGN PATENT DOCUMENTS

| | | |
|---|---|---|
| JP | 2002/534847 | 10/2002 |
| WO | WO98/59467 | 12/1998 |
| WO | WO 00/35176 | 6/2000 |

OTHER PUBLICATIONS

Wanjiun Liao, "Mobile Internet telephony: mobile extensions to H.323", IEEE, 1999, pp. 12-19.

(Continued)

*Primary Examiner*—Chi Pham
*Assistant Examiner*—Tri H. Phan
(74) *Attorney, Agent, or Firm*—Michael Haynes PLC; Michael N. Haynes; Dale R. Jensen

(57) ABSTRACT

The present invention provides a method and system for assuring H.323 alias address portability to an H.323 user in real-time H.323 multimedia communications where the H.323 user is registered with a home gatekeeper for the home zone of the H.323 user. Alias address portability may be obtained using a central database that is known to the administrative zones and is used for alias address mapping, or alternatively, may be obtained by using a distributed database. The method may be implemented by: sending, by the H.323 user, a message with a called H.323 entity's alias address, to the home gatekeeper to originate a call to the called H.323 entity; confirming that the alias address, services, and service providers are portable; converting the alias address to a called routable alias address for the called H.323 entity and sending the alias address to the H.323 user; and placing the call to the called H.323 entity.

4 Claims, 4 Drawing Sheets

U.S. PATENT DOCUMENTS

| | | | |
|---|---|---|---|
| 6,157,401 | A | 12/2000 | Wiryaman |
| 6,314,284 | B1* | 11/2001 | Patel et al. ............... 455/417 |
| 6,317,609 | B1* | 11/2001 | Alperovich et al. ..... 455/556.1 |
| 6,374,302 | B1 | 4/2002 | Galasso |
| 6,421,339 | B1 | 7/2002 | Thomas |
| 6,519,242 | B1* | 2/2003 | Emery et al. ............... 370/338 |
| 6,519,249 | B1 | 2/2003 | Bennefeld |
| 6,526,033 | B1* | 2/2003 | Wang et al. ............... 370/338 |
| 6,591,105 | B1* | 7/2003 | Hussain et al. ............ 455/444 |
| 6,628,943 | B1* | 9/2003 | Agrawal et al. ......... 455/432.1 |
| 6,654,607 | B1 | 11/2003 | Shobatake |
| 6,657,992 | B1 | 12/2003 | Christie, IV |
| 6,667,968 | B1 | 12/2003 | Tran |
| 6,693,894 | B1 | 2/2004 | Andersson |
| 6,732,177 | B1 | 5/2004 | Roy |
| 6,785,784 | B1 | 8/2004 | Jing |
| 6,862,622 | B2 | 3/2005 | Jorgensen |
| 6,925,076 | B1 | 8/2005 | Dalgic |
| 6,965,591 | B1 | 11/2005 | Roy |
| 2002/0052958 | A1 | 5/2002 | Yavatkar et al. |

OTHER PUBLICATIONS

ITU-T Study Group, International Telecommunication Union, E.164, "Series E: Overall Network Operation . . .", 199970501, May 26, 1997, International.

Roy, "H.323 Mobility Architecture and Protocol for Terminal, User, and Service Mobility", ITU-T SG16 Q. 11-15 Rapporteur Meeting, Oct. 18, 1999, 63 page(s), International Telecommunications Union, US.

Jain, "Mobil Internet Access . . .", 199809 IEEE International Conference on, vol. 3, 7-11, Sep. 1, 1998, None.

ITU-T Study Group, "International Telecommunication Union, Rec H2250, Multimedia, 199909", Sep. 1, 1999, International.

ITU-T Study Group, "International Telecommunication Union, Rec H323 Packet-based, 199909", Sep. 1, 1999, International.

Yokoyama, "TCP/IP Network Development for study from the basics Chapter 4 Host Name Solution", Windows NT World, ITG Communications Ltd., vol. 4, No. 5, May 1, 1999, pp. 108-114., May 1, 1999, US.

Roy, Radhika, "H.323 Mobilty Architecture and Protocol for Terminal, User, and Service Mobility", ITU-T SG16 Q.13/16 Rapporteur Meeting, Oct. 18, 1999, 63 page(s), International Telecommunication Union, US.

Roy, Radhika, "Inter-Gatekeeper Communications with Distributed Gatekeeper Architecture of Multiple Zones", Delayed Contribution D.164, WP2, SG16, Sep. 14 1998, 13 page(s).

None, "The International Public Telecommunication Numbering Plan", ITU-T Recommendation E.164., May 1, 1997, 27 page(s), International Telecommunication Union.

\* cited by examiner

H.323 USER, SERVICE AND SERVICE PROVIDER MOBILITY FRAMEWORK FOR THE MULTIMEDIA INTELLIGENT NETWORKING

RELATED APPLICATIONS

This application is a continuation of, claims priority to, and incorporates by reference herein in its entirety pending U.S. patent application Ser. No. 09/642,980, filed 18 Aug. 2000, which claims the benefit of U.S. Provisional Application Nos. 60/156,363 and 60/156,482, filed on Sep. 28, 1999, by Radhika R. Roy, which are hereby entirely incorporated herein by reference.

FIELD OF THE INVENTION

The present invention relates generally to audio and video conferencing services, and more particularly to coupling home/small business network-based devices using Internet Protocol (IP) techniques to provide audio and/or video conferencing services using a wide area network-based intelligent service controller.

BACKGROUND OF THE INVENTION

H.323 is an International Telecommunications Union (ITU) standard that provides a foundation for audio, video, and data communications across packet-based networks, including the Internet. Compliance with the H.323 standard permits interoperability, allowing users to communicate without concern about non-compatibility. The H.323 recommendation provides a standard for multimedia communications over packet switched networks. Such networks include many corporate networks, packet-switched TCP/IP networks, IPX over Ethernet, Fast Ethernet and Token Ring technologies, public Internet, ATM networks, and/or others. H.323 enables videoconferencing as well as addressing call control, multimedia management, and bandwidth management. Thus, H.323 encompasses inter-network multipoint conferencing among terminals that support not only audio, but also video and data communication.

Use of multimedia communications over packet-based networks has increased as an alternative form of communication due in part to the expense of the use of public-switched telephone networks (PSTN)/integrated services digital networks (ISDN). However, the packet-switched traffic can also be sent over the circuit-switched PSTN network (e.g., IP-over-PPP-over-PSTN or IP-over-PPP-ISDN), and H.323 packet bitstreams can be sent over them. Rapid expansion of packet-based networks has made the need for interoperable equipment and systems more urgent. While the H.323 has addressed terminal mobility, it has not provided a user, service and service provider mobility framework, which is needed for both the wired and wireless environment.

SUMMARY OF THE INVENTION

The present invention provides an H.323 user, service and service provider mobility framework for implementing H.323 alias address portability in real-time H.323 multimedia communications. The H.323 user is registered with a home gatekeeper for the H.323's home zone. Alias address portability may be obtained using a central database that is known to the administrative zones and is used for alias address mapping, or alternatively, may be obtained by using a distributed database. The method may be implemented by: sending, by the H.323 user, a message with a called H.323 entity's alias address, to the home gatekeeper to originate a call to the called H.323 entity; confirming that the alias address is portable; converting the alias address to a called routable alias address for the called H.323 entity and sending the alias address to the H.323 user; and placing the call to the called H.323 entity.

DETAILED DESCRIPTION OF THE PREFERRED EMBODIMENTS

Figure 1:
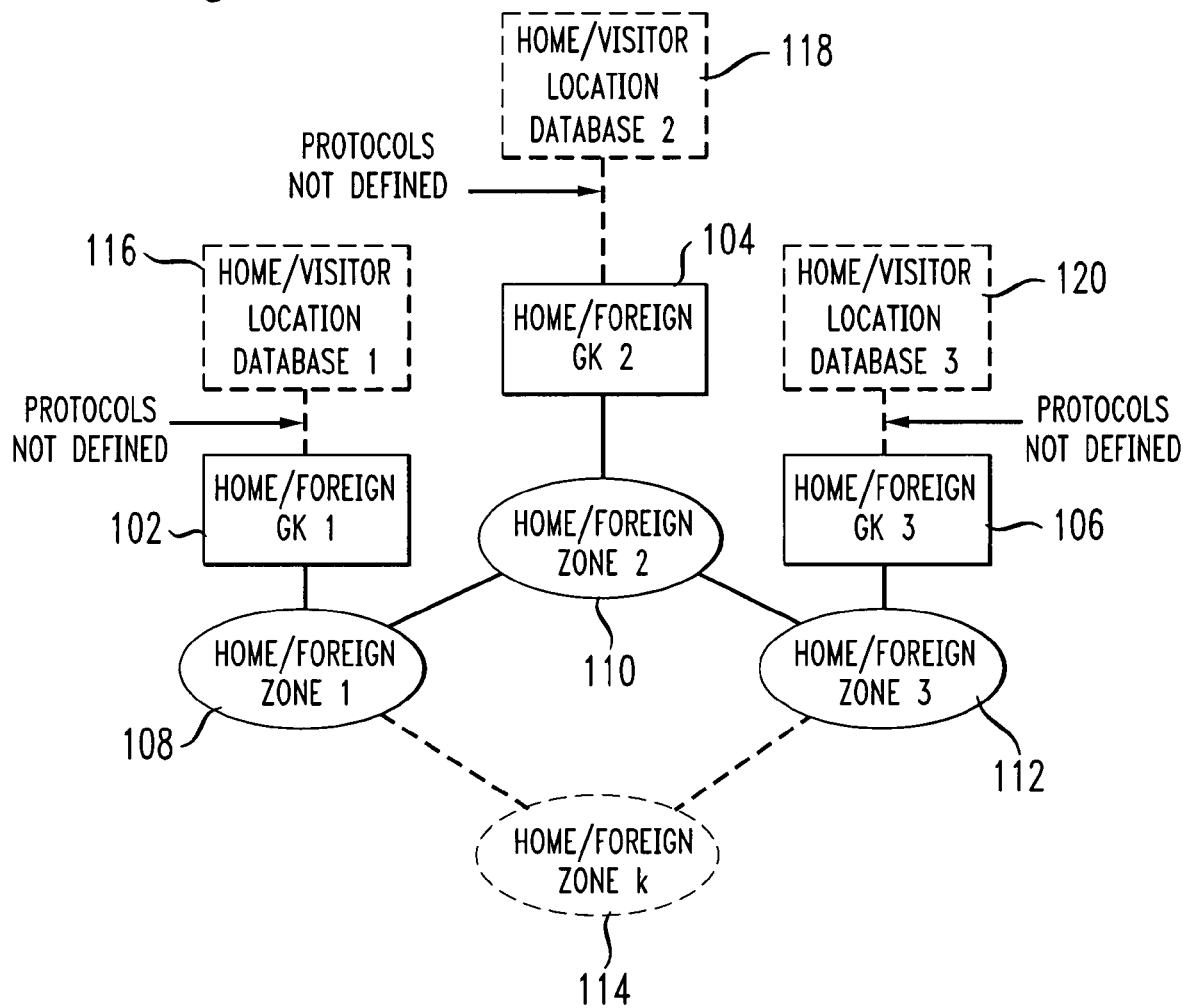
FIG. 1 is one embodiment of a zone, gatekeeper and home/visitor database architecture in accordance with the present invention.

Unlike terminal mobility, user mobility and service mobility are equally applicable for both the wired and the wireless environment because the handover during the terminal mobility is only possible in the wireless environment. Real-time H.323 multimedia communications services such as audio, video and/or data require a multimedia intelligent networking platform when the mobility of users, services such as H.450.x (i.e., supplementary services: multimedia call forwarding, multimedia call transfer, etc) and service providers are addressed. User, service, and service provider portability require a new kind of multimedia intelligent networking in the context of H.323.

User mobility is defined as the ability for a user to maintain the same user identity on different terminals or terminal types. In H.323, there can be many user identities such as alias addresses E.164, Transport Address, H323ID, URL-ID, Email-ID, Party Number, and the like, that a user can identify. In addition, more aliases such as IMEI, IMSI, and TMSI have also been proposed.

User mobility is defined as an ability of a user to access H.323 services at any terminal, i.e., maintaining the same user identity on different terminals or terminal types, and the capability of the H.323 system is an ability to provide the H.323 services according to the user's subscription. User mobility also allows the user to register on any terminal for incoming and outgoing calls.

Thus, user mobility and terminal mobility are independent of each other. An H.323 user may have a sequence of optional alias addresses:

E.164
IMEI
IMSI
TMSI
URL-ID
Email-ID
Party Number
Personal ID
Transport Address

For example, E.164 may be the first item that a user may like to keep the same on different terminals. The E.164 number portability in H.323 is almost the same local number portability (LNP) issue as in the intelligent network (IN). Again, LNP is also related to the service mobility, service provider mobility, and location (geographic) mobility (beyond or outside a rate center).

Similarly, with the present invention, other user identities may be kept the same. In each case, there will be a different implication in the networking.

In addition, an endpoint that a user is usually identified with will also have a call signaling or transport address and a RAS address. An endpoint may also use different transport or network addresses for different channels (e.g., audio, video, and/or data) within the same call. The basic assumption is that the call signaling address and the RAS address are not considered to be fixed while considering the H.323 user mobility. By same token, the transport or network address that can be used as an alias address by a user's endpoint is not considered to kept fixed for the user mobility.

In summary, the following can be noted in the context of the user mobility:

Selected candidate H.323 alias addresses may be kept fixed for user mobility such as, for example: E.164, IMEI, IMSI, and/or TMSI, URL-ID, Email-ID, and/or party number.

Personal Ids may be utilized.

No transport or network address either for the endpoint alias or for the call signaling address or RAS address is kept fixed.

As an example, E.164 may be kept fixed for the user mobility, and may be used to show the impact of the user mobility in the context of H.323 multimedia communications. Then, the other alias addresses may be considered to analyze the impact on the user mobility.

Service mobility is defined as the ability for a user to obtain a particular service independent of user and terminal mobility. That is, the foreign network must have the means to obtain the parameters required for the service.

Service mobility means that the user may have the same H.323 services (e.g., H.450.x supplementary services such as multimedia call forwarding, multimedia call transfer, etc.), may keep the same user identity (user mobility), or may use the same terminal (terminal mobility) as the user moves from its home network to a foreign one. Service mobility may also imply that the user may use the same user identity (user mobility) or the same terminal (terminal mobility) after changing H.323 service providers. As used herein, service mobility is discussed in the context of user mobility only.

Service provider mobility is defined as the ability for a user to maintain the same user identity on different terminals or terminal types after changing the service providers. The network or networks that carry an H.323 multimedia call may have more multiple carriers. The user mobility implies that the alias address or addresses are portable. For example, for the E.164 address, there must be a mechanism that provides for the portable E.164 address to be mapped over the physical packet-based network for actual routing of the call.

The mapping function of the E.164 address to an actual routable call in H.323 may be similar to the local routing number (LRN) method in the IN. In fact, the service provider portability in H.323 may be achieved using a method similar to IN's LRN. However, using such a method has severe implications on the H.323 networking because a significant amount of analysis is needed to understand how the service provider portability can be accomplished. There are many ways H.323 multimedia (audio, video, and/or data) services (e.g., H.450.x) may be offered by the service providers with the user mobility. This user, service, and service provider mobility is termed "multimedia intelligent networking".

H.323 uses alias addresses for endpoints. Such alias addresses are used to identify users. More alias addresses such as IMEI, IMSI, TMSI, and personal ID have also been proposed. In the case of mobile users, one or more of the alias addresses may be fixed while the users move from one place to another. In the present invention, the H.323 users, like endpoints, are also associated with the H.323 alias addresses. In the present invention, if a user wants to keep the same identity while moving from place to place, the following objectives are needed to maintain both service and service provider mobility:

Alias address portability supports the H.323 services (e.g., H.450.x), features, and capabilities without degradation in service quality and network reliability below a predetermined level.

The implementation of the alias address portability is done very efficiently without requiring subscribers to change their alias addresses.

A service provider routes the H.323 multimedia (audio, video, and/or data) call to customers without being affected by the networks of other carriers when the alias address portability is implemented.

In H.323, the alias addresses have been described as:

An endpoint may also have one or more alias addresses associated with it. An alias address may represent the endpoint or it may represent conferences that the endpoint is hosting. The alias addresses provide an alternate method of addressing the endpoint. These addresses include E.164 or partyNumber addresses (network access number, telephone number, etc.), H.323 IDs (alphanumeric strings representing names, e-mail-like addresses, etc.), and any others defined in Recommendation H.225.0. Alias addresses are unique within a Zone, Domain, among Zones, and among Domains. Gatekeepers, MCs, and MPs do not have alias addresses.

When there is no Gatekeeper in the system, the calling endpoint addresses the called endpoint directly using the Call Signaling Channel Transport Address of the called endpoint. When there is a Gatekeeper in the system, the Gatekeeper translates the called endpoint into its Call Signaling Channel Transport Address or alias address. The called endpoint's E.164 address may consist of an optional access code followed by the E.164 address. The access code consists of n digits from the set of 0 to 9, * and #, where n is a predetermined number whose number of digits and their meaning is left to the discretion of the manufacturer. One purpose of such an access code might be to request access to a Gateway. The Gatekeeper may alter this address prior to sending it to the destination.

The H.323 ID consists of a string of ISO/IEC 10646-1 characters as defined in Recommendation H.225.0. It may be a user name, conference name, e-mail name, or other identifier. An endpoint may have more than one alias address, including more than one of the same type, which is translated to the same Transport Address. The endpoint's alias addresses are unique within a Zone. In this embodiment, the call signaling transport or network address and the RAS transport or network address are not kept fixed in the context of the user mobility.

In H.323, the called endpoint's E.164 address may consist of an optional access code followed by the E.164 address. E.164 provides a 10-digit telephone number of format NPA-XXX-XXXX. In this format, Number Plan Area (NPA)

may be a geometric information code (GIC) or a service access code (SAC). The last seven digits usually represents a subscriber number in the NXXXXXX where N is a number between 2 and 9, and X is a number between 0 and 9. In this subscriber number format, the first three digits (i.e., NXX) are typically a central office (CO) code that identifies the CO switch of the telephone number. There may also be some subcategories in the NPA code such as geographic NPA (G-NPA) (e.g., area codes) and non-geographic NPA (NG-NPA) (e.g., 800-number, 900-number, mobile user numbers).

Thus, the H.323 communications system deals with the packet-based network (PBN). In this context, an E.164 number used by a user or endpoint may be considered to have a kind of non-geographic significance. Such is also the case with respect to user mobility where an H.323 user wants to keep the same identity even if the user moves from one place to another.

H.323 deals with the multimedia (audio, video, and/or data) calls. A call may be point-to-point, point-to-multipoint, or multipoint-to-multipoint. The call-processing intelligence may be centralized as well as distributed over the packet-based networks (e.g., IP, ATM). The user, service, and service provider mobility requires that the alias addresses be portable and be kept fixed while users roam from place to place. Consequently, these portable addresses will have no geographical significance with respect to the packet-based networks. Such networking is termed as multimedia intelligent networking (MIN) in the context of H.323. In other words, multimedia intelligent networking adds multimedia (audio, video, and/or data) service capabilities to the packet-based networks, which are independent of the involved packet switches (e.g., IP routers, ATM switches).

With MIN, service providers can rapidly and flexibly provision multimedia services to customers. What makes MIN so powerful is that multimedia services may be deployed on centralized or distributed databases across the network based on cost-performance trade-offs. As shown in FIG. 1, in H.323, each mobile entity needs to register with its home gatekeeper GK1 102, GK2 104, GK3 106. The mobile entity designates its home GK, which becomes the central controlling point to manage its mobility. Each mobile entity has a home/foreign zone 108, 110, 112, 114. Even if a mobile moves to a foreign zone, it needs to register with a foreign GK. As a result, a GK needs to manage the location information for both home and foreign visitors. A GK has databases 116, 118, 120 for keeping location information for both home and visitor or foreign locations. The terminology "foreign" and "visitor" are used interchangeably herein. Hence, like the GK architecture, the home/visitor architecture is also distributive.

With respect to terminal mobility, both distributed and centralized databases may be used to manage the location as the user moves with its terminal from one place to another. In H.323, each mobile entity needs to register with its home GK. The mobile entity designates its home GK, which becomes the central controlling point to manage its mobility. Even if a mobile moves to a foreign zone, it needs to register with a foreign GK. As a result, a GK needs to manage the location information for both home and foreign visitors. Thus, each GK has and maintains databases for home and visitor location information. FIG. 1 shows one embodiment of zones, GKs and home/visitor databases architecture in accordance with the present invention.

However, in H.323, the services between the GK and the location database are known as the backend services and the protocol between these functional entities is known as the backend services protocol. Since the backend services and the protocol have not yet been standardized in H.323, any known backend service and protocol technique may be used.

Location management involves the updating of location databases when current location information is available. During the call establishment, these databases are queried to determine the current location of the mobile entity. Such querying may be costly, especially when the mobile entity is located far away from its assigned home GK. So, the location management may need to be further optimized. In one embodiment, the location of the home location information may be centralized to optimize location management.

Figure 2:
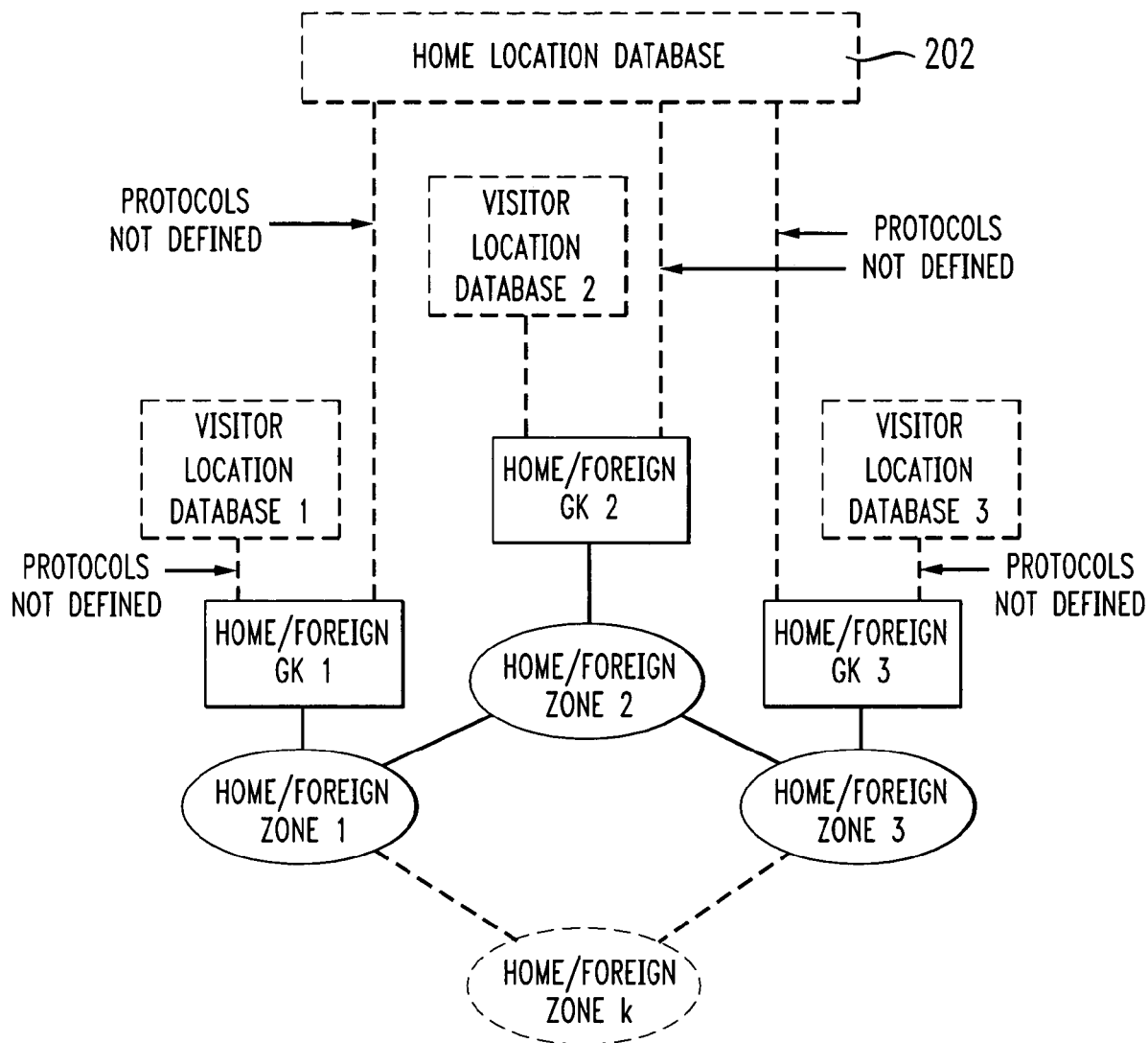
FIG. 2 is one embodiment of gatekeepers and zones with a centralized home location database architecture in accordance with the present invention.

As shown in FIG. 2, in this centralized home location database architecture, the management is generally simpler because the home location of a mobile entity remains the same, and this information may be kept in a central database 202. However, the scalability of such a solution may be problematic, especially in the context of the large-scale IP network or the public Internet. There may also be hierarchical databases for managing the location information. The choice of using a distributive location management database vs. using a centralized location management database is a matter of choice of implementation. Both embodiments are described below.

For user, service, and service provider mobility, the following assumptions are made to simplify the analysis:

Every administrative domain has a single zone.

An E.164 alias address assigned to an H.323 user is kept fixed as the user moves from one place to another.

Originally, a domain for an alias address (e.g., an E.164 address) assigned to a user in an administrative domain is known as donor domain.

If the alias address is moved from a donor domain due to roaming of the user, the new domain is called the recipient domain.

The moved alias address is referred to as a ported number.

Database methods for alias address portability utilize the alias address databases to route multimedia (audio, video, and/or data) calls to their destinations. However, a portable H.323 alias address is not a network routable number. It needs to be translated to a network address for routing the call to the destination.

Figure 3:
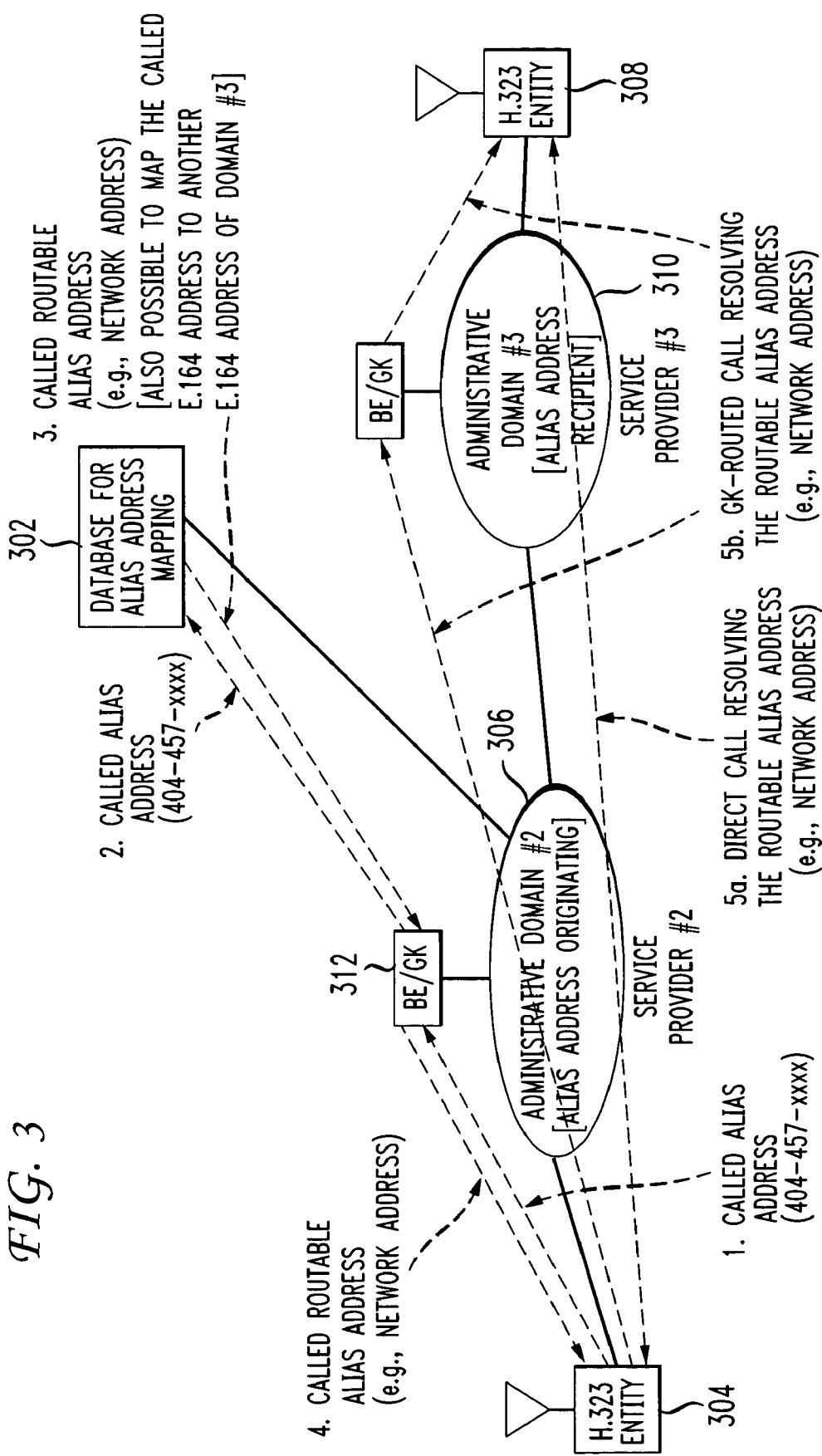
FIG. 3 is one embodiment of a method of providing alias address portability using a decentralized database in accordance with the present invention.

The following describes call scenarios in the case of the centralized database. As shown in FIG. 3, a central database 302 that is known to all administrative zones may be utilized to provide alias address mapping. User mobility is implemented using the database. For example, a call is placed by a calling H.323 entity 304 residing in administrative domain 2 306. The called H.323 entity is a mobile user whose alias address (e.g., E.164) remains the same as it moves from place to place. The called mobile user 308 has an alias address assigned from an administrative domain and has moved to administrative domain 3 310. Upon going to administrative domain 3, the H.323 user registers with the BE or GK of domain 3, typically in a similar way of registering in the case of terminal mobility, which is known to those skilled in the art and will not be described further here. Typically, registration information has also been updated in the central database that provides the alias address mapping. The triggering mechanism for updating the database for user mobility is not defined in the H.323 standard. However, following the MIN concept, multimedia call delivery to a ported alias number consists of the following steps as shown in FIG. 3:

Step 1: The calling H.323 party 304 connected to administrative domain 2 306 wants to place a call to a called party 308. The calling H.323 party 304 sends a RAS message (usually ARQ) with the GK 312 of its own domain that contains the called party's alias address (e.g., 404-457-xxxx (E.1641). The details of the call flow are not shown for simplicity. When the number is received by the GK/BE 312 of the originating domain 1, the interaction between the GK/BE 312 and the database 302 occurs.

Step 2: The GK/BE 312 of domain 2 306 sends a query to the database 302 containing the called party's alias address (e.g., 404-457-xxxx). The database 302 identifies that this alias address is in the ported address, and a query is launched to the corresponding alias address portability database of the central database (a database may be partitioned in many ways: alias address type, portable alias address, non-portable alias address, etc.).

Step 3: The database 302 maps the ported alias address (e.g., 404-457-xxxx) to the actual routable network address (e.g., an IP subnetwork address) in which the mobile user 308 is presently connected. (If necessary, 404-457-xxx may also be mapped to another E.164 address). The recipient's routable network address (e.g., IP subnetwork address) is sent back to the GK/BE 312 of the originating domain 306 with the indication that the called alias has been the ported number.

Step 4: The originating GK or BE 312 sends the resolved routable network address of the called entity 308 to the calling party 304 (It may happen in the form of an ACF message of H.323). It may be noted that the called alias number has been the ported number and does not provide the actual information about the location of the called party 308. The caller 304 may actually like to know about the billing rate before placing the call. The caller 304 may proceed to learn the billing and other related information before placing the call.

Step 5: The caller 304 can now place the call either directly (Step 5a) or via the GK (Step 5b), knowing the routable address.

In the above scenario, all information of all service providers of all administrative domains is available in a central database. However, all information of all service providers of all administrative domains may not always be available. Some service providers may keep the databases separate. Then the interaction among many databases will be required. The following describes an embodiment wherein the database is distributed.

Figure 4:
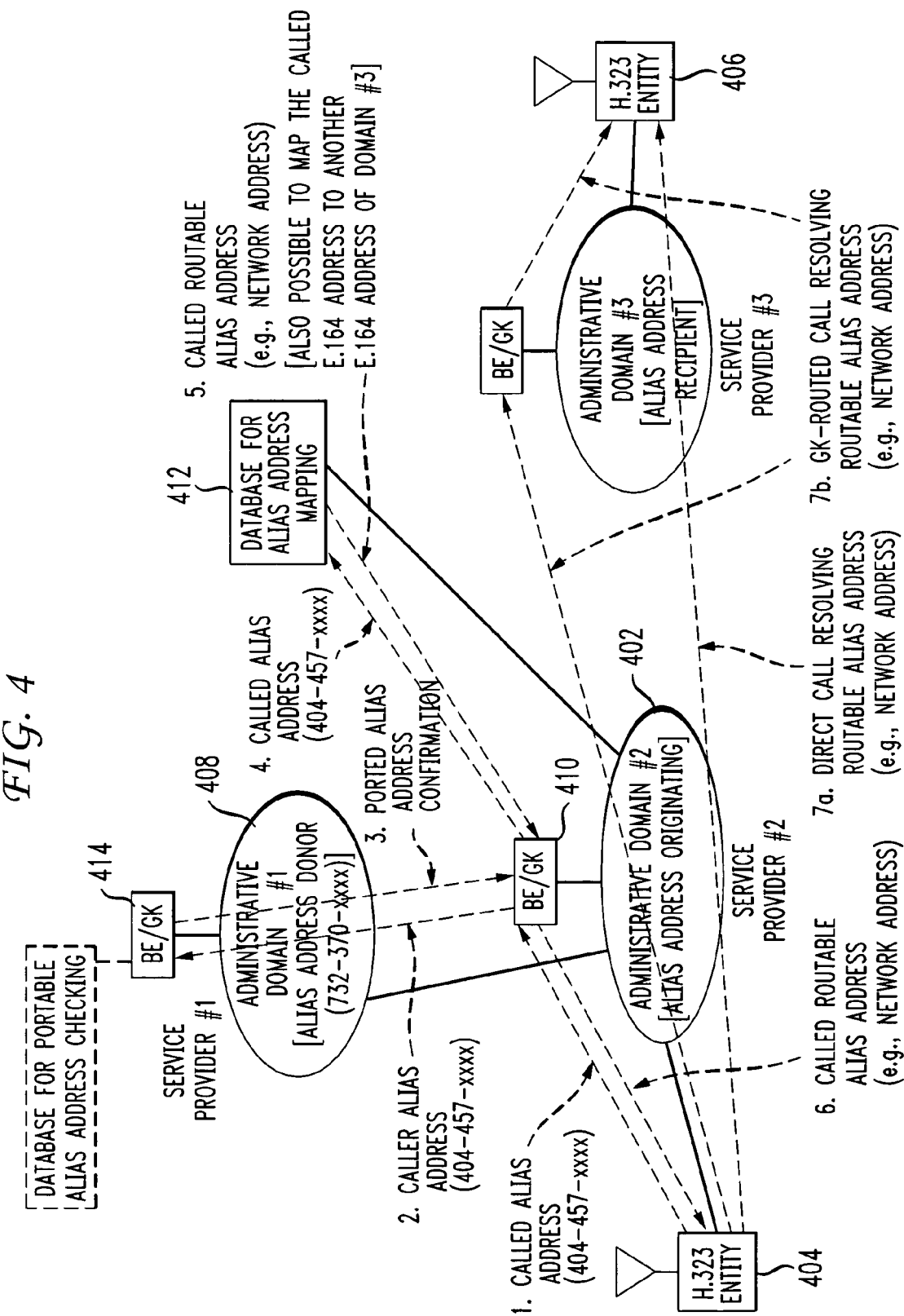
FIG. 4 is one embodiment of a method of providing alias address portability using a distributed database in accordance with the present invention.

In the above embodiment, there was a donor administrative domain that provided the user with a ported alias address. If a ported number is donated by any service provider of any administrative domain, there may be a mechanism that determines the domain of that service provider. FIG. 4 shows this case using the example of E.164 alias addresses.

FIG. 4 illustrates an example wherein an H.323 user 404 is connected to administrative domain 2 402 and wants to place a call to another user 406 whose E.164 alias address is 404-457-xxxx. By knowing the NPA-NXX, it is possible to determine that administrative domain 1 (service provider 1) 408 is the donor of this alias address. So, domain 1 408 is the domain that has the information on whether this alias address is portable or not. It shows how the alias address is allocated, and whether information with certain criteria may be distributed among different databases. In FIG. 4, the following steps may be used in a distributed environment in accordance with the MIN concept:

Step 1: As in FIG. 3, the calling H.323 party 404 connected to administrative domain 2 402 wants to place a call to a called party 406. The calling H.323 party 404 sends a RAS message (usually ARQ) with the GK of its own domain that will contain the called alias address (e.g., 404-457-xxxx (E.1641). The detail of the call flow is not shown for simplicity. When the number is received by the GK or BE 410 of the originating domain 1 402, the interaction between the GK or BE 410 and the database 412 occurs.

Step 2: The GK or BE of domain 2 402 decides that the alias address pattern of 404-457-xxxx tells that the administrative domain 1 (service provider 1) is the donor of this alias address and sends a query message with the alias address (404-457-xxxx) to the BE or GK 414 of domain 1 408 (usually via H.225.0 Annex G's accessRequest message) to check whether it is a portable address or not.

Step 3: The GK or BE 414 of domain 1 408 launches a query in its alias portable checking database to find whether the alias address (404-457-xxxx) donated by it is portable or not. The donor domain (administrative domain 1 [service provider 1]) determines that the called alias address has been ported out after analyzing the database and sends a confirmation message to the BE or GK 410 of domain 2 402.

Step 4: The GK or BE 410 of domain 2 402 sends a query to the database 412 containing the called alias address (e.g., 404-457-xxxx). The database 412 identifies that this ported alias address needs to be mapped to the actual network routable address (e.g., IP subnetwork address).

Step 5: The database 412 maps the ported alias address (e.g., 404-457-xxxx) to the actual routable network address (e.g., an IP subnetwork address) in which the mobile user 406 is presently connected. (if necessary, 404-457-xxx may also be mapped to another E.164 address). The recipient's routable network address (e.g., IP subnetwork address) is sent back to the originating GK or BE 410.

Step 6: The originating GK or BE 410 sends the resolved routable network address of the called entity 406 to the calling party 404 (It may happen in the form of an ACF message of H.323). It may be noted that the called alias number has been the ported number and does not provide the actual information about the location of the called party 406. The caller may actually like to know about the billing rate before placing the call. The caller 404 may proceed to learn the billing and other related information before placing the call.

Step 7: The calling party 404 may now place the call either directly (Step 7a) or via the GK (Step 7b), knowing the routable address.

If the alias address is non-ported, the query to the donor domain saves an unnecessary database query that is needed in the case of the centralized database case. This results in cost savings. However, if the alias address is a ported number, there may be some issues that need to be resolved between the donor (original carrier or original service provider) and originator (new carrier or new service provider) related to the routing and cost of the call to the customers.

Several scenarios may be considered for the database queries that have implications especially when multiple service providers are involved. If an H.323 multimedia (audio, video, and/or data) call involves several service providers, there can be the following alternatives to trigger the database query:

Originating Service Provider Scenario: The originating service provider may perform the database query in the case of the originating service provider scenario.

Terminating Service Provider Scenario: The terminating service provider may also perform the database query in the case of the terminating service provider scenario.

"K-1" Scenario: In this situation, the service provider immediately prior to the terminating service provider performs the database query.

First-GK/BE-that-can-Scenario: For the, the first GK or BE (in the H.323 call path) that has the database access capability performs the query.

Each scenario has implications on call routing and billing. The standards may specify each case with appropriate signaling mechanisms for queries, and implementations may be made considering cost-performance trade-offs.

The central database architecture may have scalability problems when the alias addresses portability is deployed nationwide (similar to 800/900 databases) or worldwide. A more appropriate solution may be to maintain the regional databases. Then the issue becomes: Who will maintain the alias addresses portability databases? Will these databases be maintained by one or more neutral third parties so that the alias addresses resources are efficiently made available to new H.323 service providers. In one embodiment, the databases may contain only the ported alias addresses, the associated routable network addresses and service provider information.

In one embodiment, addresses may be cached by the GKs. Similar caching mechanism may also be applied for the alias addresses portability. In database-based alias addresses portability, it is likely that some of the ported alias addresses are frequently accessed from an originating GK or BE. In that originating GK or BE, one may keep a cache to map the frequently ported alias addresses to the routable network addresses of their recipient GKs or BEs. Thus, the routing information of the frequently ported alias addresses may be obtained from the cache instead of the expensive MIN query to the alias addresses portable (AAP) database. The cache approach may be applied using the following steps:

Step 1: If the RAS signaling message (e.g., ARQ) is sent, the originating GK or BE checks whether the alias address can be found in the cache. If so, a cache hit occurs, the routable network number of the recipient entity (GK, BE or H.323 endpoint where the mobile is residing) is obtained from the cache. After going through the H.323 RAS signaling procedures (the detail is not discussed for simplicity), the H.323 call is routed to the recipient entity following steps 4 and 5 described in FIG. 3. Otherwise, a cache miss occurs, and the next step is executed.

Step 2: The originating GK or BE queries the AAP database following steps 2 and 3 in FIG. 3. After the GK or BE receives the routable network number of the recipient entity from the AAR, an entry in the cache is created to store the ported alias number and the corresponding network routable number.

Step 3: The H.323 call is routed to the recipient entity following steps 4 and 5 described in FIG. 3.

A cache policy may be formulated by determining which criteria to use to cache an alias address and the associated routable network number. If the cache is full and the GK or BE wants to add a new cache, the cache policy may determine which cache is to be replaced.

The H.323 user mobility scheme requires that the alias addresses need to be portable. The same alias addresses will be used by users as they move from one place to another. The scenarios described earlier show that problems of the user, service, and service provider mobility are interrelated.

Once the H.323 signaling protocol (extensions of RAS and creation of new signaling messages for the database queries to provide backend services) is enhanced to include all functionalities described above will also allow a user to keep the same alias number after changing the service providers. Thus, it also serves the purpose of the service provider mobility.

The H.323-based MIN system may be similar to the traditional PSTN/ISDN intelligent networking (IN) system. The following issues need to be resolved to provide interoperability between the two systems:

Which alias addresses will be considered for portability first?

What specific criteria will be used for the alias address portability (portable vs. nonportable)?

How centralized databases vs. distributed databases selected?

How is synchronization maintained in the case of distributed databases?

Are new signaling messages generated to define backend services? Or is it possible to extend the existing message?

H.323 user, service, and service provider mobility can be provided by requiring that the alias addresses are portable. The proposed architecture and protocol shows how the H.323 MIN offers flexibility for alias addresses portability. User, service, and service provider mobility may be provided based on the following:

The probable alias addresses that can be ported are E.164, IMEI, IMSI, TMSI, URL-ID, EmailID, Party Number, and Personal ID.

There should be a mechanism to differentiate between ported and non-ported alias address for each alias address type.

The ported alias address needs to be mapped to a network routable address. The mapping can be done using database methods and cache approaches.

The database method can be centralized as well as distributive. In each case, there are issues that affect the users, services, and service providers. In nationwide or worldwide implementation of the databases, it requires to determine how the databases should be maintained: Individual Service Provider vs. Third Party.

In the case of the distributive implementation, the protocol that will be used for communications between the administrative domains needs to satisfy the service providers' requirements as described in this contribution.

In the case of the cache approach method, the policy for cache maintenance should be standardized considering the buffer size.

H.323 protocol (e.g., RAS) needs to extended to accommodate the needs for triggering the database queries for determining the ported alias address and mapping the ported alias address to a routable network address as described in this contribution. If necessary, the H.323 backend services protocol needs to be developed in conjunction with the extension of RAS.

The mobility management of the terminals, users, services, and service providers should be implemented as is known in the art. For example, as the users roam from one place to another, they need to register in the new location as is known in the art to receive the services using the ported alias addresses.

The interworking between the H.323-based MIN proposed in this contribution and the traditional PSTN/ISDN IN needs to be defined.

The present invention provides an overall architecture and overview of the protocol for the user, service, and service provider mobility primarily in the context of inter-domain communications although the same principles can also be used for intra-domain or inter-zone communications. The example also shows all media (e.g., audio, video, and data) as if they are following the same path from their source and destination. As a result, it is as if all media have also followed the same address portability as shown in those examples. However, it is also possible that each of the media may follow a different path through the network although they have the same source and destination addresses (e.g., E.164 addresses). For example, audio, video and data may originate from the same source address and can reach the same destination address, but the real-time audio and video may follow the same path for maintaining the stringent performance constraint, while the path for data traffic through the network may be different from that of the audio and video. There may be several reasons why the path for the data traffic will be different: 1. Data traffic may be handled by a different network or service provider from that of the audio/video, and 2. Data traffic may be offered a different QoS from that of the audio/video, although the services may be offered by the same network or service provider. Keeping the same source and destination address, the intermediate addresses of the data traffic may be different. In this scenario, it is quite possible to have address portability for the intermediate address(es) of the data traffic considering: 1. Either a single or multiple service providers, 2. Either single or multiple zones, and/or 3. Either a single or multiple domains.

The proposed architecture also complements the terminal mobility architecture, which is known. Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A method for assuring H.323 alias address portability, services portability, and service provider portability to an H.323 user in real-time H.323 multimedia communications where the H.323 user is registered with a home gatekeeper for a home zone of the H.323 user, comprising the steps of:

sending, by the H.323 user, a message with a called H.323 entity's alias address, to the home gatekeeper to originate a call to the called H.323 entity;

confirming that the alias address is portable;

converting the alias address to a called routable address for the called H.323 entity and sending the routable address to the H.323 user; and placing the call to the called H.323 entity.

2. A method for providing H.323 alias address portability to an H.323 user in real-time H.323 multimedia communications wherein a geographical location is divided into home/visitor zones, and wherein each home/visitor zone has an associated home gatekeeper that maintains a centralized home/visitor location database for home and visitor location information wherein administrative zones of the geographical location of the centralized home/visitor location database are known and the H.323 user is registered with a home gatekeeper for the home zone of the H.323 user, comprising the steps of:

sending, by the H.323 user, a message with a called H.323 entity's alias address, to the home gatekeeper to originate a call to the called H.323 entity;

translating, by the home gatekeeper, the alias address to a called routable address for the called H.323 entity;

sending, by the home gatekeeper, the called routable address to the called H.323 entity; and placing the call to the called H.323 entity, wherein an alias address assigned to the H.323 user is kept fixed as the user moves from one place to another.

3. A method for providing H.323 alias address portability to an H.323 user in real-time H.323 multimedia communications wherein a geographical location is divided into home/visitor zones, and wherein each home/visitor zone has an associated home gatekeeper with an administrative domain having an administrative domain database for providing alias addresses to a requesting home gatekeeper, wherein administrative zones of the geographical location of the administrative domain database are known and the H.323 user is registered with a home gatekeeper for the home zone of the H.323 user, comprising the steps of:

sending, by the H.323 user, a message with a called H.323 entity's alias address, to the home gatekeeper to originate a call to the called H.323 entity;

sending a query message with the alias address to a home gatekeeper of the administrative domain for the called H.323 entity to determine portability of the alias address;

where the administrative domain of the H.323 user confirms portability of the alias address, implementing the following steps:

querying a database containing the alias address to determine whether the alias address must be mapped to a routable address and where the alias address must be mapped, implementing the following steps:

mapping the alias address to the routable address for the called H.323 entity;

sending the routable address for the called H.323 entity to the H.323 user; and placing the call to the called H.323 entity, wherein an alias address assigned to the H.323 user is kept fixed as the user moves from one place to another.

4. A computer readable medium tangibly embodying computer executable instructions to perform a method for providing H.323 alias address portability to an H.323 user in real-time H.323 multimedia communications wherein a geographical location is divided into home/visitor zones, and wherein each home/visitor zone has an associated home gatekeeper that maintains a centralized home/visitor location database for home and visitor location information wherein administrative zones of the geographical location of the centralized home/visitor location database are known and the H.323 user is registered with a home gatekeeper for the home zone of the H.323 user, the method comprising the steps of:

sending, by the H.323 user, a message with a called H.323 entity's alias address, to the home gatekeeper to originate a call to the called H.323 entity;

translating, by the home gatekeeper, the alias address to a called routable address for the called H.323 entity;

sending, by the home gatekeeper, the called routable alias address to the called H.323 entity; and placing the call to the called H.323 entity, wherein an alias address assigned to the H.323 user is kept fixed as the user moves from one place to another.

* * * * *